United States Patent [19]

Bishop et al.

[11] 3,719,812

[45] March 6, 1973

[54] DYNAMIC ELECTROMAGNETIC ENVIRONMENT SIMULATOR

[75] Inventors: Glick U. Bishop; Robin B. Knox, both of Littleton, Colo.

[73] Assignee: Martin Marietta Corporation, New York, N.Y.

[22] Filed: Nov. 1, 1971

[21] Appl. No.: 194,420

[52] U.S. Cl. ..........235/151.31, 235/151.3, 307/265, 307/271, 324/73, 343/17.7, 325/363
[51] Int. Cl. ..........................H03k 1/12, G05b 23/02
[58] Field of Search..........235/151.31, 92 FQ, 151.3; 307/271, 264, 265, 266, 267, 260, 106; 328/108, 111, 115; 324/73 AT; 343/17.7; 325/141, 120, 363

[56] References Cited

UNITED STATES PATENTS

| | | | |
|---|---|---|---|
| 3,246,240 | 4/1966 | Arnold et al. | 324/73 |
| 3,275,810 | 9/1966 | Moses et al. | 235/151.3 X |
| 3,659,087 | 4/1972 | Green et al. | 235/151.3 |
| 3,250,923 | 5/1966 | Liska et al. | 307/271 X |
| 3,657,658 | 4/1972 | Kubo | 307/271 X |
| 3,670,209 | 6/1972 | Hensen | 307/265 X |
| 3,651,315 | 3/1972 | Collins | 235/151.31 X |

Primary Examiner—Malcolm A. Morrison
Assistant Examiner—Edward J. Wise
Attorney—Gay Chin et al.

[57] ABSTRACT

This invention is a test system for simulating in real time the electromagnetic signal received by a piece of electronic equipment under test by a plurality of simultaneously operating environmental transmitters having time-varying transmission parameters and having time-varying relative positions with respect to the receiver. The parameters of the dynamic problem are processed by a general purpose computer that provides binary coded digital control data on storage tape. During a test simulation, the tape is run and the tape data is used to control a plurality of time-shared signal generators that create a plurality of signals simulating in real time the result at the unit under test of the individual signals generated by various emitters in the environment. The outputs of the signal generators are combined and supplied to the unit under test, permitting a realistic appraisal of its performance in real time under the simulated conditions.

6 Claims, 6 Drawing Figures

PRF CHANNEL

RF GENERATION CHANNEL

HELIX REGISTER AND D/A CONVERTER

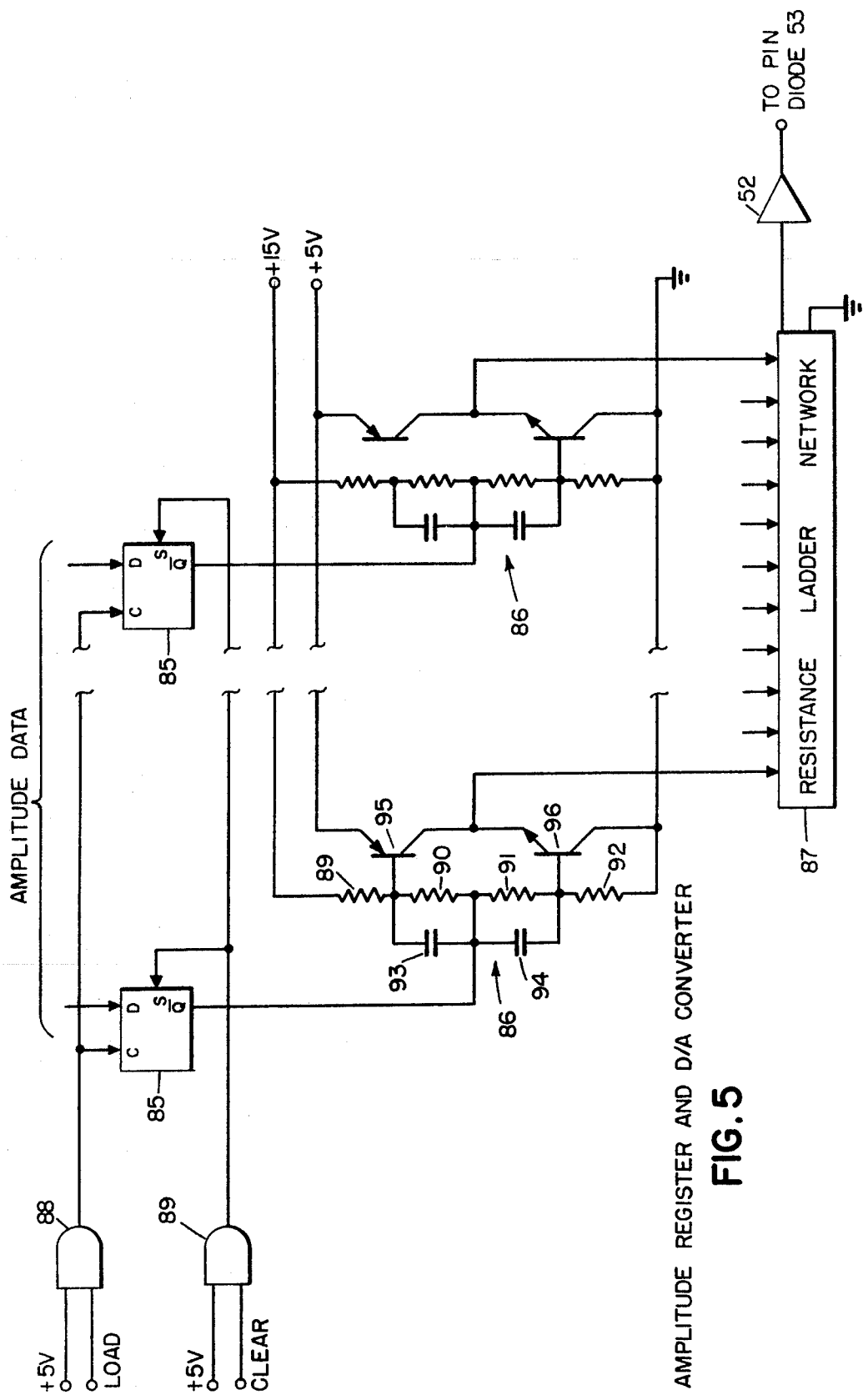
FIG. 5 AMPLITUDE REGISTER AND D/A CONVERTER

DYNAMIC ELECTROMAGNETIC ENVIRONMENT SIMULATOR

BACKGROUND OF THE INVENTION

Most existing electronic test equipment, even the most sophisticated with computer programmed and controlled test signal generation, provides a one-signal-at-a-time input to the equipment to be tested. This type of testing, while permitting evaluation of the response of the unit under test to various sequentially applied stimuli, is not adequate for some electronic equipment that must operate in an environment of time-varying emissions from a number of transmitters, and where the distances of the transmitters, or emitters, from the receiver may also be varying with time. This type of environment, with time-varying transmitter parameters and/or time-varying transmitter-receiver distances, will be referred to sometimes herein as a dynamic electromagnetic environment.

An example of equipment operating in such a dynamic electromagnetic environment is a piece of military electronic airborne equipment. As the aircraft carrying such equipment describes its flight path, the electronic equipment receiver will be subjected to an environment created by variously located radars, jammers, and the like having different and often varying frequencies, scan patterns, duty cycles, beam characteristics, etc. In addition to the varying emitter parameters, the signals received by the equipment will vary in time with the distances between it and the emitters. To test an equipment subjected to this environment, as well as to train operators, it is desirable to provide, with the equipment in operation, as accurate and complete a simulation as possible, in real time, of the time-varying electromagnetic signals that it would receive as the plane proceeds on its flight path.

An airport flight control system provides another example of equipment operating in a dynamic electromagnetic environment, in this case with fixed, ground-based equipment and moving aircraft transmitters. It would be desirable to test such equipment by simulating the environment created by the shifting pattern of approach aircraft radios, radars, and other transmitters.

Still another dynamic situation exists where both the tested receiver and the transmitters to be simulated are in motion, i.e. in the testing of an airborne collision avoidance system.

It is an object of this invention to provide a test system for electronic equipment that can accurately simulate the performance of the equipment in a dynamic electromagnetic environment created by a plurality of emitters where there exists one or more of time-varying (a) emitter parameters and (b) relative emitter positions with respect to the tested equipment.

It is a more specific object of this invention to provide a test system capable of simulating the effect of such environmental emitters where the emitters are pulsed emitters.

It is a further object of this invention to provide a test system in which a single frequency controlled signal generator is used on a time-shared basis to simulate a plurality of simultaneously operating emitters having different emission parameters, including different frequencies.

SUMMARY OF THE INVENTION

Briefly, the objects of the invention are achieved by feeding into a general purpose computer data on the varying relative positions of the environmental emitters and the equipment under test, the parameters of the emission from the environmental emitters, the transfer functions of the simulator test equipment hardware, and the characteristics of the equipment under test upstream of the point of insertion of the simulated signals from the test set. The computer is programmed to use this information to provide on a storage medium, preferably magnetic type, binary code digital information to control the generation by the test system hardware of signals simulating in real time the signals that would be received by the equipment under test from the emitters in the environment.

To perform a simulation, the tape is placed in the test system hardware and run, and the test equipment hardware translates the signals on the tape into a signal simulating the result, at the equipment under test, of the environmental emitters, which resulting signal is fed into the equipment under test as it is being operated in a normal manner. While the simulated radiation signal is being fed in, an operator of the equipment under test can observe the effect of environmental radiation upon its operation.

The operation of the test system hardware in an environment including pulsed emitters, which is where it is most useful, is briefly as follows. Data defining the PRF for each of the emitters operating simultaneously in any time period is fed to the PRF generator that is assigned to that particular emitter. Data describing the other parameters of the emissions, including frequency, pulse width, and amplitude, is stored in a memory.

Each PRF generator generates, in accordance with the data fed to it, the appropriate PRF. As a PRF generator signals the time for each pulse, the other emission descriptors relating to that particular emission are retrieved from the memory and fed to the RF generation channel covering the appropriate frequency band, where the descriptors control the generation of the pulse. Immediately after generation of the pulse, these emission descriptors are cleared from the RF generation channel and that channel is then available for the generation of other pulses as directed by other PRF generators. While the data defining the PRF, then, remains in the PRF channel while it repetitively generates PRF pulses, the data necessary to create an RF pulse is supplied to the RF channel anew each time a PRF pulse occurs.

The RF channels each contain a backward wave oscillator (BWO) which is frequency agile in that its frequency may be adjusted quickly over its operating band, on a pulse-by-pulse basis, by varying its helix voltage. Sufficient RF channels are provided so that their contiguous frequency bands cover the total frequency range of interest. Since each RF channel is tied up only for a short period prior to and during the transmission of each pulse and since the frequency of its BWO oscillator may be adjusted throughout its range very quickly, just prior to the transmission of each pulse, each RF channel may be time shared by a number of pulse emissions having different frequencies, as long as they are within its frequency band.

Therefore, it is not necessary to have a separate RF channel, or a separate RF oscillator, corresponding to each of the simulated emitters that is operating simultaneously during a given time period. This permits economy in RF generators, and only enough are needed to provide coverage of the frequency range of interest. In simulations where a large number of emitters are to be simulated, this economy becomes important.

The outputs of the RF channels are then combined, and the resulting combined signal is fed to the equipment under test.

DESCRIPTION OF THE DRAWINGS

The operation of the test system of this invention and the manner in which it achieves its above-stated objectives may be understood by reference to the following detailed description of a specific embodiment, in conjunction with the drawings, which form a part of the specification, and in which:

FIG. 3a shows the relative positions of two waveforms occurring in the RF generation channels;

FIG. 5 is a diagram, partially schematic and partially in block form, of an amplitude register and associated digital-to-analog converter, forming a part of an RF pulse generation channel.

DESCRIPTION OF A PREFERRED EMBODIMENT

The embodiment described herein is designed for testing a piece of airborne electronics equipment, such as a reconnaissance sensor, in a simulated flight or mission through an environment populated with S-band RF pulse emitters. While the particular arrangement and construction of equipment shown and described is specific to that particular problem, the principle of the invention is applicable to simulation of any dynamic electromagnetic environment.

Figure 1:
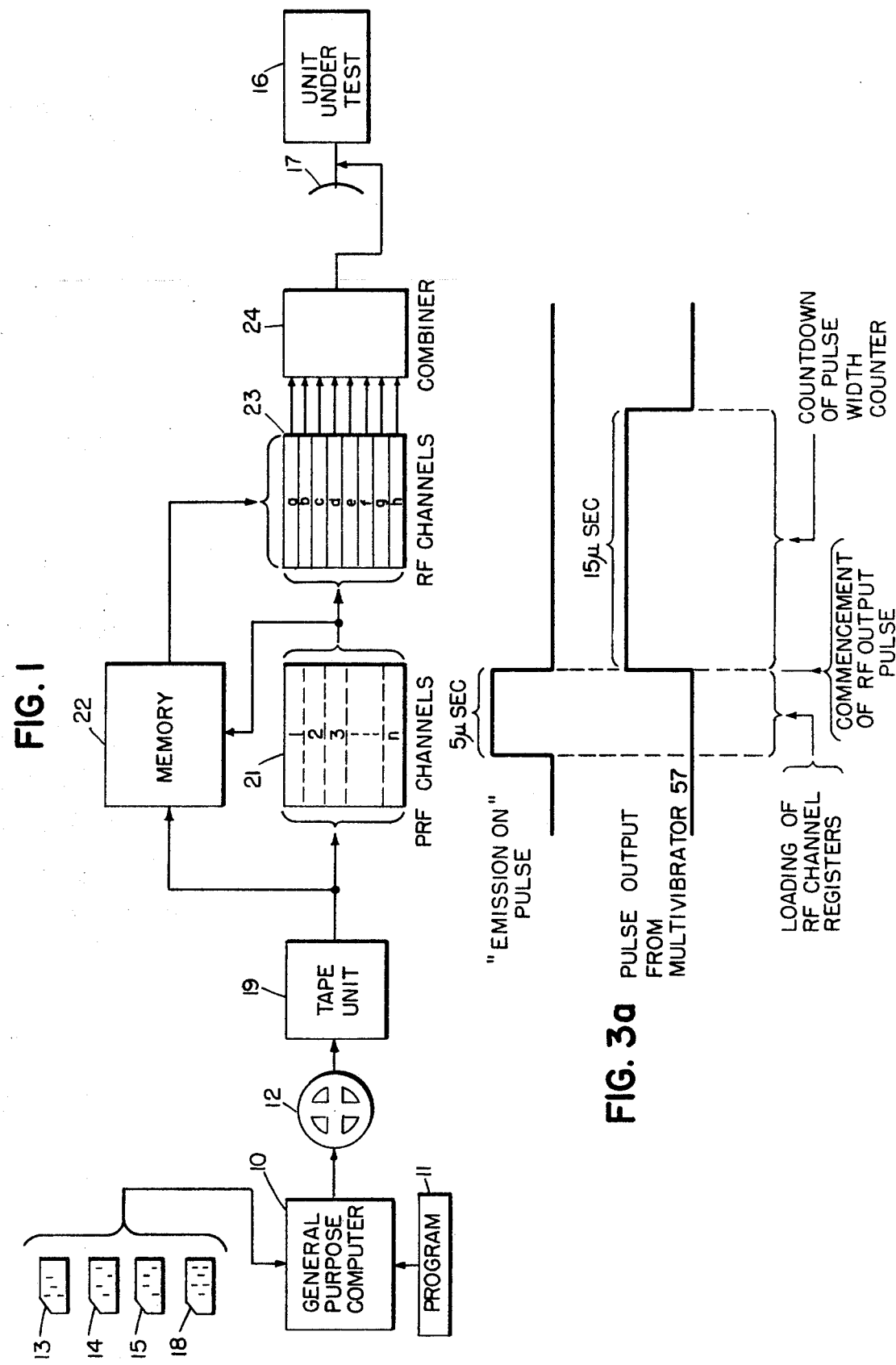
FIG. 1 is a functional block diagram of the overall system.

Turning to FIG. 1, a general purpose computer 10, such as an IBM 360/44, is programmed with a program 11 written to perform the computations required by the general dynamic problem to be solved. When the parameters defining a specific mission of the aircraft through a specified environment, and the particulars of the hardware transfer function and certain of the characteristics of the tested receiver are inserted, the computer outputs onto magnetic tape 12 digital data, defining, in real time, the signals to be input to the receiver in the course of the simulation.

The data parameters supplied to computer 10 are shown schematically as decks of punched cards at the left of FIG. 1, although obviously any conventional method of feeding this information to the computer may be used. Card deck 13 contains data defining the parameters of the S-band pulse emitters to be encountered in the simulated flight, such as their operating frequencies, pulse recurrence frequencies (PRFs), antenna beam characteristics, and power, as well as their locations. Deck 14, the mission deck, defines the flight path of the aircraft carrying the unit under test, including course and speed. Deck 15 defines the parameters of the antenna of the unit under test. In FIG. 1, the test signals are shown being fed to the unit under test (UUT) 16 just in back of, or downstream of, its antenna 17. This is generally the most feasible place in which to inject the test signals, and, as a consequence, the characteristics of antenna 17, such as gain and beam characteristics, must be factored into the computation of the signal that would be received there. It is these antenna characteristics that are contained in deck 15. If the test signals are to be introduced at another point in the receiver chain, then all characteristics of the receiver upstream of the place of introduction should be included in the computation.

Deck 18 defines the transfer functions of the test system hardware. Improved hardware design is possible by including the transfer functions in the initial computations. Then the hardware designer does not have to make disadvantageous trade-offs to achieve linearity of response, since hardware nonlinearities are compensated for by including them in the computations that generate the signal-defining data.

The digital data may conveniently be recorded in binary form on nine tracks, each byte thus containing nine parallel bits, with one bit being a parity check and the other eight bits comprising data. Once the data for a specific test run is recorded on tape 12 by the off-line computer, the reel of tape is stored until a simulation test is to be performed.

To perform a simulation test, tape 12 is placed in tape unit 19 and run. Tape unit 19 includes a tape transport for running the tape and appropriate and conventional registers for storing the binary coded digital data from the tape and selectively routing it to the appropriate portions of the test system hardware. The particular tape transport used is not critical, and for this embodiment a Texas Instrument Model 959 was found practical. This tape transport has a tape speed of 120 inches per second, and with tape recorded at a density of 800 bytes per inch, is capable of transferring data at the rate of 96,000 bytes per second.

The data removed from tape 12 by tape unit 19 includes data defining the parameters of the simulated emissions, address data and timing data. This data, and other data and signals generated within the test set, is transferred among the various units of the test system by means of a data bus, which is not shown, and the selective transfer of the data is accomplished by means of conventional address coding and decoding. Except where necessary to explain the operation of a particular subsystem, address encoders and decoders and the manner of encoding the data are not shown or described in order not to unduly complicate the explication. Where certain types of data are indicated herein as being presented to certain registers, for instance, the address coding and decoding necessary to effect this are assumed without the necessity of further mention. This is conventional practice for routing binary coded data throughout a logic system and methods and circuitry for effecting it are standard and well known in the art.

An "emission" as used herein refers to the transmission from one of the environmental transmitters and to the simulation of that transmission in the test set. "Emission descriptor" data defines the parameters of a particular emission and is of four types, defining four different characteristics of the emission: (1) PRF; (2) frequency; (3) pulse width; and (4) pulse amplitude. Each emission requires emission descriptors of all four types to create or stimulate that particular emission within the test system. All of the emission descriptors are coded with the address of the particular one of PRF channels 21 in which the PRF for that particular emission is to be generated, and the frequency, pulse width and pulse amplitude descriptors are also coded with the address of the particular one of the RF generation channels 23 in which the RF pulses for that emission are to be generated.

Tape unit 19 routes the PRF descriptors to the PRF generation channels 21 and routes the frequency, pulse width and pulse amplitude descriptors to memory 22.

Figure 2:
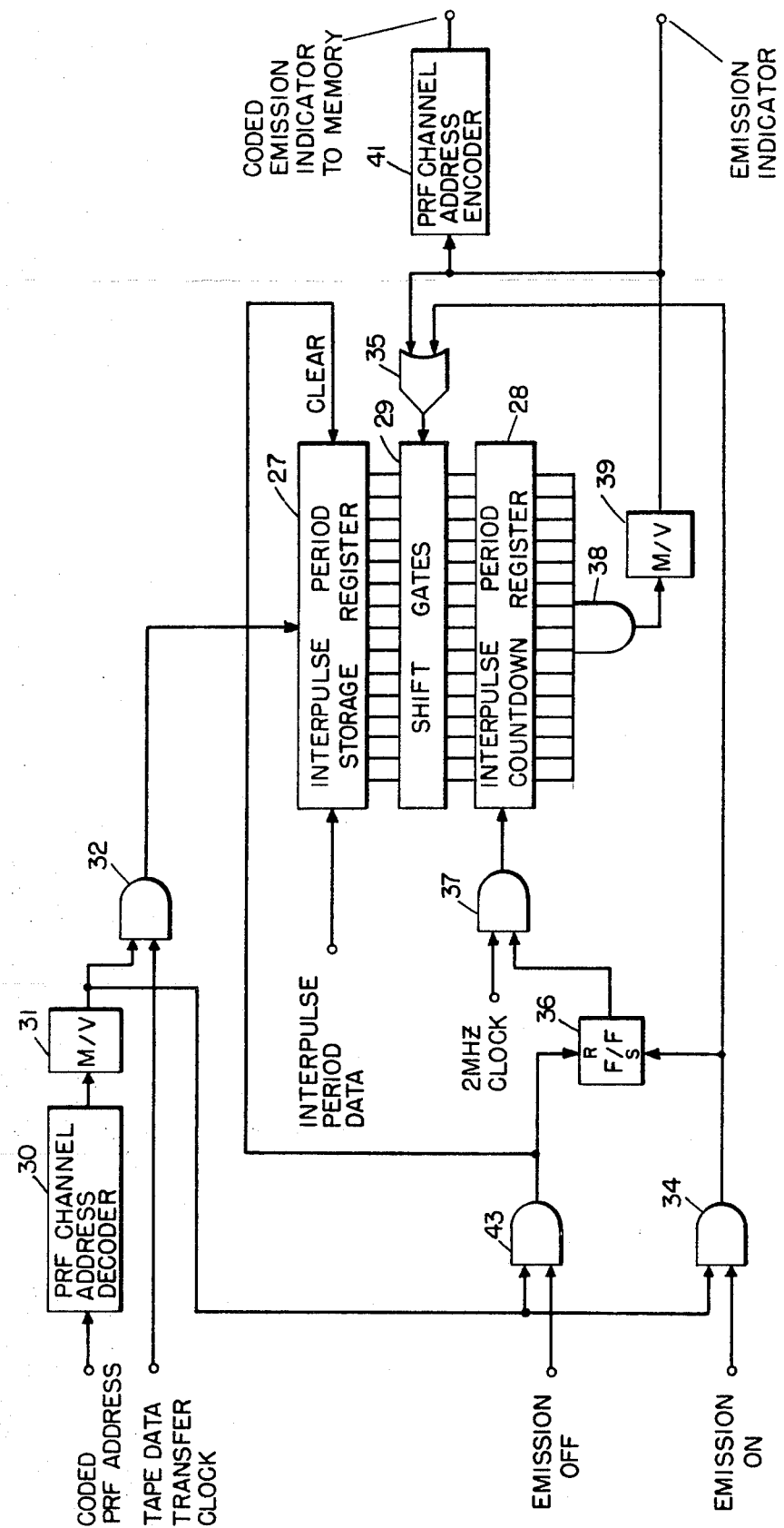
FIG. 2 is a functional block diagram of one of the identical PRF generation channels.

The PRF data descriptors, being address coded with the identification of a particular one of PRF channels 21, will effect generation in that channel of the appropriate PRF for the emission. The number of identical PRF channels 21 required by the system depends on the number of emitters that the system must simultaneously simulate. The PRF channels are indicated as numbered 1, 2, 3, ... n within the PRF channels block 21 on FIG. 1. There are sufficient PRF generation channels provided to assign a separate channel to each transmitter or emitter that is being simultaneously simulated at a given time. As the aircraft bearing the equipment under test passes beyond the range of a particular transmitter, then the PRF channel previously assigned to that transmitter becomes available for new assignment to another transmitter that is now or presently will be coming within range. Therefore, it is not necessary to provide a separate PRF channel for each transmission to be simulated during the total time of the test simulation, but, as stated above, only enough are needed to provide on a one-to-one basis for the maximum number of transmitters or emitters to be simulated at any one time. Details of the PRF channels and their operation in generating PRFs are shown in FIG. 2 and described below.

As a specific PRF generated in one of channels 21 indicates the imminence of a pulse, the other emission descriptors are retrieved from memory 22 and sent to the appropriate one of RF channels 23 for creation of the pulse.

Memory 22 may be of any conventional type with appropriate and conventional input and access means, as long as it is nondestructive in nature and possesses sufficient access speed. A solid state memory using TTL logic storage chips as the memory elements has been found satisfactory. Emission descriptors stored in the memory (frequency, pulse width and pulse amplitude descriptors) are coded both as to the PRF to which they correspond and as to the particular one of RF channels 23 to which they correspond. When a PRF generator signals a pulse, the descriptors coded for that PRF are retrieved from memory 22 and sent to the RF channel for which they are coded.

In this embodiment, the emitters to be simulated are S-band pulse emitters, and eight RF channels (designated as $a, b, c, \ldots h$ within RF channel block 23 in FIG. 1), are used, identical except for frequency, to cover the S-band, from 2000 – 4000 MHz. An emission simulation is assigned to the RF channel with a frequency band that includes the frequency of the desired emission. In the RF generation channel, described in detail below in connection with FIG. 3, frequency descriptors adjust the frequency of a backward wave oscillator (BWO) to the appropriate point within the band by varying the voltage on the BWO helix, the pulse width descriptors control an electronic switch that opens and closes the line, creating a pulse of the required width, and the amplitude descriptors control a PIN diode that acts as a voltage controlled variable resistance to attenuate the amplitude of the pulse.

The pulses appearing at the output of the eight RF channels are fed into an eight-way power combiner and added to produce the resulting test signal which is fed into unit under test 16. The power combiner may be any conventional RF combiner such as are available commercially from Microwave Associates, Inc., Anaren, or other manufacturers. These devices have one terminal at one end, and a plurality of terminals at the other end (generally being any power of two) and function as either power dividers or power combiners, depending upon their orientation.

PRF GENERATION CHANNELS

One of the identical PRF channels is shown in block form in FIG. 2. The principal components of the channel are an interpulse period storage register 27, an interpulse period countdown register 28, and a set of shift gates 29 for transferring information from storage register 27 into countdown register 28. The pulse recurrence frequency (PRF) is defined by data that specifies the period between the pulses, the interpulse period (IPP). The IPP data is stored in storage register 27, gated by shift gates 29 into countdown register 28 when it is desired to begin an emission, counted down to zero in countdown register 28, after which a signal is emitted which initiates the retrieval of the other emission descriptors from memory 22 and which orders the RF channels to create an RF pulse. Then the PRF registers recycle by again gating the data from the storage register to the countdown register and again counting down toward the next pulse.

The address coded PRF descriptors (the IPP data) may be fed to storage register 27 at any time prior to the commencement of an emission. The address is decoded in PRF channel address decoder 30 and the output from decoder 30 causes a one-shot multivibrator 31 to generate a pulse. This pulse, applied to AND gate 32, enables that gate to pass the 10 MHz tape data transfer clock to storage register 27 and the IPP data from tape unit 19 is serially clocked into the storage register at a 10 MHz rate. The pulse output from multivibrator 31 need only be sufficiently long to permit storage register 27 to acquire the data, and a 20 microsecond pulse is satisfactory. The IPP data from tape unit 19 is presented to the IPP storage registers in each PRF channel, but only the channel to which it is addressed will provide a multivibrator pulse to enable the data transfer clock to reach register 27 and clock in the data. The IPP data remains in storage register 27 until it is time to initiate the emission.

When the emission is to begin, an address coded EMISSION ON signal is sent to all PRF channels, the address code again providing an enabling pulse from multivibrator 31 which enables the EMISSION ON signal to pass through AND gate 34. The EMISSION ON pulse activates OR gate 35 which causes shift gates 29 to parallel shift the IPP data from storage register 27 down into countdown register 28. The data in storage register 27 is not destroyed by the shift. The EMISSION ON output from gate 34 also is applied to the SET input of flip-flop 36, causing the flip-flop output to AND gate 37 to enable that gate and allow the 2 MHz countdown clock to be applied to the countdown register. The clock counts down the IPP data that has just been shifted into that register until all zeros are recorded in the register. Then the countdown register output AND gate 38 is enabled and causes a 5 microsecond EMISSION INDICATOR pulse to be generated by multivibrator 39.

The output pulse from multivibrator 39 does two things: it activates OR gate 35 to shift the IPP data down from the storage register to the countdown register to begin another interpulse period countdown, and it sets in motion the generation of an RF pulse. In order to accomplish the latter, the multivibrator output pulse is encoded with the address of the PRF channel in encoder 41 and the coded EMISSION INDICATOR signal is sent to the memory to retrieve the other emission descriptors bearing the same PRF channel code, and these are sent to the RF generation channel for which they are also encoded. The unencoded EMISSION INDICATOR signal is sent to the RF generation channels to command execution of the RF pulse.

The PRF channel will repetitively count down at the PRF defined by the IPP data in its register and emit EMISSION INDICATOR pulses at the end of each count until stopped by an EMISSION OFF signal. This signal, again PRF channel address coded, is enabled to pass through AND gate 43 by the pulse from the output of address multivibrator 31. It sends a signal to the CLEAR input of storage register 27 to remove the IPP data from the register, and is applied to the RESET input of flip-flop 36. It resets that flip-flop, and with no output from flip-flop 36 to AND gate 37, the 2 MHz countdown clock is effectively turned off as it can no longer reach the register. The PRF channel is then ready for an assignment to a new emission.

It should be noted that since the IPP data is non-destructively maintained in the storage register and only shifted out at the beginning of each IPP countdown, the IPP data may be conveniently updated at any time by sending out new address coded IPP information to replace that in the storage register.

Throughout the system, conventional 5 volt TTL logic has been used, and the structure and operation of components used in this Logic, such as AND and OR gates, multivibrators, and delay elements are entirely conventional and well known, and such elements are widely available commercially. The storage and countdown registers are also conventional. For storage register 27, four MOdel N8270A 4-bit shift registers, available from Signetics, have been used, only 15 of the 16 available shift register bits being used. The shift gates 29 and countdown register 28 are shown as separate blocks in FIG. 2 only to aid in the explanation. In practice, both of these functions are incorporated into one unit, and four presettable binary counter/storage registers Model N8281A available from Signetics have been used, again with only 15 of the 16 available register bits being needed.

RF GENERATION CHANNELS

Figure 3:
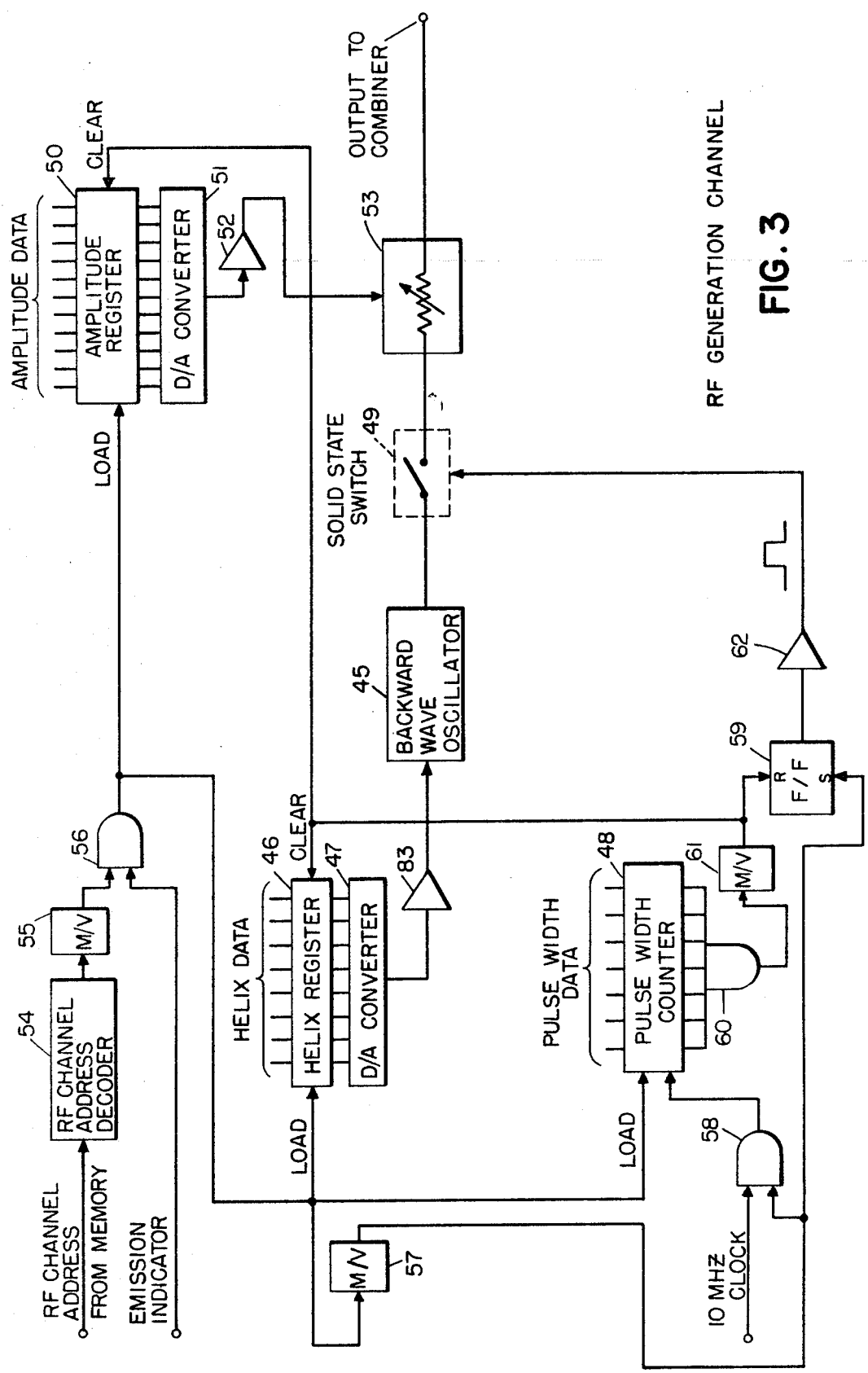
FIG. 3 is a functional block diagram of one of the substantially identical RF pulse generation channels.

FIG. 3 shows in block form one of the eight RF generation channels indicated collectively as 23 in FIG. 1. Each channel, which is identical with each other except for its frequency of oscillation, uses a backward wave oscillator (BWO) as an S-band RF source. The BWO center frequency is set by placing the appropriate permanent voltage on the BWO cathode. Frequency emission descriptors, also referred to as helix data, are converted to a voltage in the range of approximately ±100 volts in a bipolar helix register 46, digital-to-analog (D/A) converter 47 and associated circuitry and applied to the BWO helix to adjust the frequency for the pulse to any frequency within the band of the RF channel. The BWO is used as the RF oscillator because its frequency may be adjusted rapidly by varying the helix voltage. Other oscillators having rapidly adjustable frequencies, such as voltage tuned magnetrons, broadband serrodynable traveling wave tubes, and varactor tuned solid state oscillators, may also be used. In this embodiment, the BWOs used are Watkins Johnson Model SE-215A-26 and the eight bands are as follows:

| Band No. | Center Frequency | Upper Band Edge | Lower Band Edge |
|---|---|---|---|
| 1 | 2260 Hz | 2480 M Hz | 2000 MHz |
| 2 | 2665 MHz | 2837 MHz | 2481 MHz |
| 3 | 2985 MHz | 3121 MHz | 2838 MHz |
| 4 | 3200 MHz | 3310 MHz | 3122 MHz |
| 5 | 3400 MHz | 3500 MHz | 3311 MHz |
| 6 | 3600 MH z | 3680 MHz | 3501 MHz |
| 7 | 3780 MHz | 3850 MHz | 3681 MHz |
| 8 | 3955 MHZ | 000 MHz | 3851 MHz |

In addition to the frequency adjustment accomplished by the helix descriptors, there are two other controls effected in creating the RF pulse: pulse width and amplitude.

The RF pulse width is formed, not by turning the BWO on and off (it remains on continually), but by controlling, through the operation of pulse width counter 48, into which the pulse width descriptors are loaded, the opening and closing of solid state switch 49.

The amplitude descriptors from memory 22 are loaded into an amplitude register 50 and in a D/A converter 51 and amplifier 52 are converted into a current used to adjust PIN diode 53, which at these frequencies, acts as a voltage controlled impedance.

The sequence of operation of the RF channel in generating a pulse is as follows. When the PRF channel orders an output pulse, it sends a PRF coded EMISSION INDICATOR pulse to memory 22 and the frequency, pulse width, and amplitude descriptors are retrieved from the memory and presented to helix register 46, pulse width counter 48, and amplitude register 50, respectively. This data is presented to the appropriate register in each RF channel, but it is acquired by the registers of the correct channel only because of the enabling signal produced by a combination of the RF channel address coding carried by the emission descriptors and the EMISSION INDICATOR signal from the PRF channel. The RF channel address from memory 22 is decoded in RF channel address decoder 54 which provides an output that triggers a one-shot multivibrator 55 to produce a pulse of approximately six microseconds. The length of this pulse is not critical but must be long enough to permit the trailing edge of the EMISSION INDICATOR pulse to pass through AND gate 56 as will be explained below. The EMISSION INDICATOR pulse is sent from the PRF channel to all RF channels but is received only by the RF channel to which the corresponding emission descriptors are addressed.

As soon as AND gate 56 is enabled, the gate output provides a "load" signal to the two registers and the counter, and the data presented to them in parallel form is loaded into them. AND gate 56 will be enabled for approximately five microseconds, sufficient time to load the registers and counter, and then will be closed by the trailing edge of the EMISSION INDICATOR signal, since the pulse from multivibrator 56 is a little longer than the EMISSION INDICATOR pulse. The trailing edge of the EMISSION INDICATOR pulse, by turning off AND gate 56, causes one-shot multi-vibrator 57 to emit a pulse of approximately 15 microseconds. The leading edge of this pulse corresponds to the trailing edge of the EMISSION INDICATOR pulse and marks the beginning of the output pulse from the RF channel. The relationship of the EMISSION INDICATOR pulse and the pulse output from multivibrator 57 may be seen in FIG. 3a.

The pulse from multivibrator 57 is used to enable AND gate 58 to pass the 10 MHz clock signal to pulse width counter 48 to count down the pulse width data stored there. The leading edge of the pulse is applied to set flip-flop 59 to define the beginning of the output RF pulse. When the 10 MHz clock counts down the data in pulse width counter 48 to all zeros, AND gate 60 is enabled, triggering one-shot multivibrator 61 to generate a short pulse that resets flip-flop 59 and ends the pulse output from the flip-flop and defines the end of the RF pulse. The logic level pulse output from flip-flop 59 is fed through amplifier 62 and turns solid state switch 49 on and off, opening and closing the line at the output of continually operating BWO 45 to form the RF pulse.

The pulse output of multivibrator 61 at the end of the pulse width count also operates to clear the helix and amplitude registers so that they are ready for the introduction of the emission descriptors for the next pulse. There is no need to clear the pulse width counter, since it counts down to all zeros, emits its pulse, and then stops. It is designed to create just one pulse from the pulse width data supplied to it and has no provision for recycling, as do the registers in the PRF channels. After the execution of the RF pulse, the RF channel is clear and awaits directions to generate the next pulse, which may be the succeeding pulse in the same emission if the channel is being used for only one emission, or which may be a pulse from another emission having a different frequency within the band, if the channel is being used on a time-shared basis to simulate more than one emitter. Since the emission descriptors forming each pulse are freshly entered into the RF channel each time a pulse is to be transmitted, the characteristics of an emission may be continually updated in accordance with the variations of the simulation by entering updated emission parameters in memory 22. When the next pulse is to be formed, the updated emission descriptors will be retrieved from the memory and used to create the new pulse.

The pulse width data comprises seven bits of binary data which, counted down at 10 MHz rate, permits a pulse of up to about 12.7 microseconds duration. Thus the 15 microsecond gate pulse out of multivibrator 57 enables the clock input to counter 48 long enough to permit countdown of any possible pulse. Counter 48 is of conventional design and may be, for instance, formed of two Signetics Corporation MOdel 8281A presettable binary counter/storage registers, using seven of the eight available stages. Solid state switch 49 may be MOdel S22040H supplied by G-L Industries.

HELIX REGISTER AND D/A CONVERTER

Figure 4:
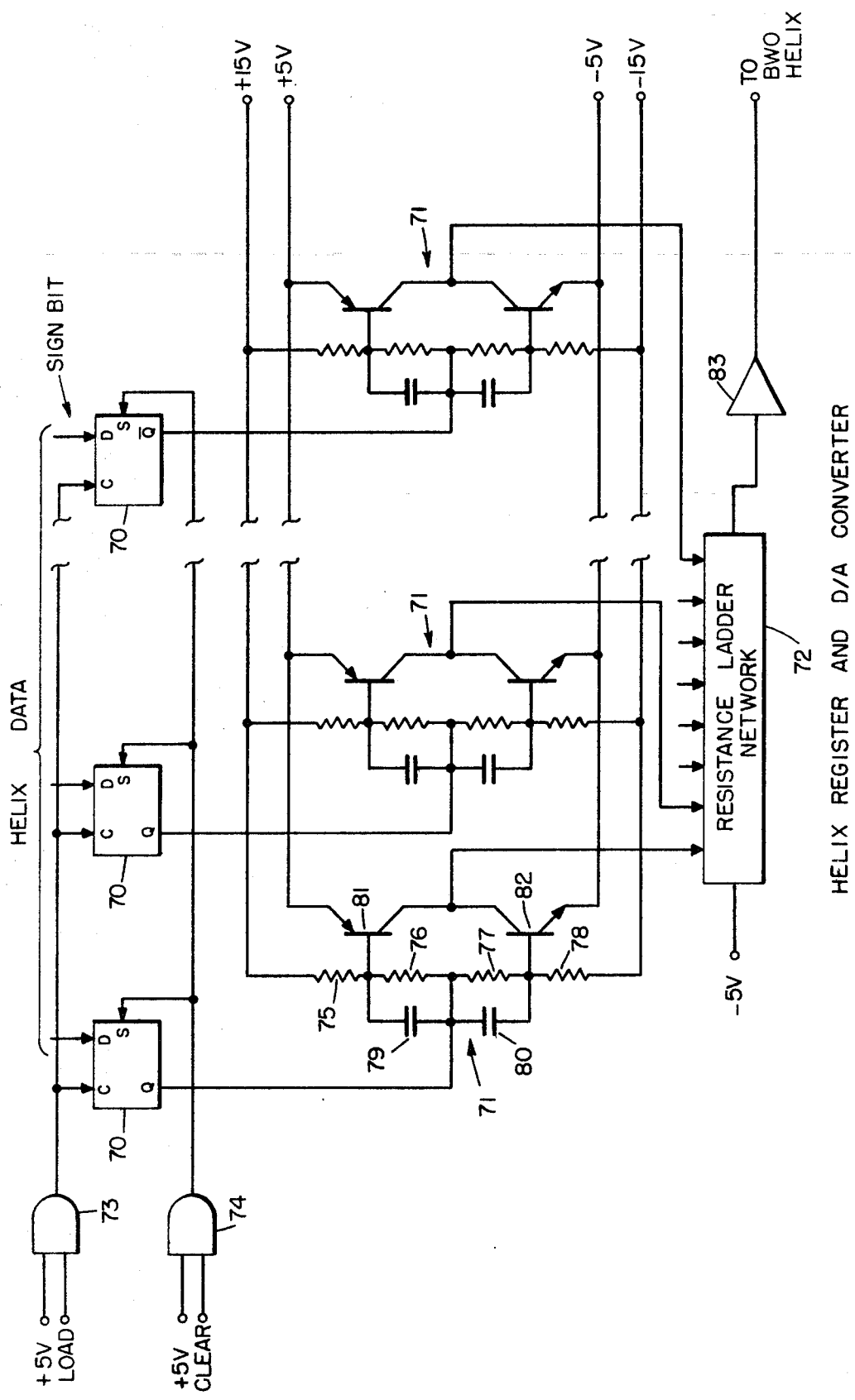
FIG. 4 is a diagram, partially schematic and partially in block form, of a helix register and associated digital-to-analog converter, forming a part of an RF pulse generation channel.

The helix register, D/A converter and associated circuitry, which are shown in some detail in FIG. 4, are bipolar circuits which acquire the helix binary data and transform it into a voltage in the range of ±100 volts which is fed to the helix of BWO 45 to vary its frequency around its center frequency, which is set by the BWO cathode voltage. With the helix voltage set at zero, the BWO will oscillate at its center frequency. A positive helix voltage increases the BWO frequency and, conversely, a negative helix voltage lowers it.

There are eight identical flip-flops 70 which form the register 46. Each is connected to one of eight identical transistorized switch networks 71, each of which is in turn connected to an input of resistance ladder network 72. For convenience, only three of the flip-flops 70 and associated switch circuits 71, the first two and the last, are illustrated in FIG. 4. The frequency data, or helix data, from memory 22 comprises eight bits, seven data bits and a sign bit, which are presented to the D terminals of flip-flops 70. The sign bit is the most significant bit and is applied to the right hand flip-flop, as illustrated in FIG. 4, with the flip-flop on the left acquiring the least significant bit. The C terminals of flip-flops 70 are connected together and receive a five volt signal from gate 73 when it is enabled by a LOAD signal generated by gate 54 shown in FIG. 3. This five volt signal loads the data bit appearing at each D terminal into the flip-flop, where it appears at output terminal Q in seven of the flip-flops, and at output $\overline{Q}$ in the flip-flop at the far right in FIG. 4, for reasons set forth below. The S terminal of flip-flops 70 are connected together and receive a five volt signal to clear the flip-flops when gate 74 is enabled by a CLEAR signal from multivibrator 61 shown in FIG. 3.

Each switch circuit 71 comprises four series connected resistors, with capacitors 79 and 80 connected across resistors 76 and 77 respectively. The junction of resistors 75 and 76 is connected to the base of PNP transistor 81 and the junction of resistors 77 and 78 is connected to the base of NPN transistor 82. The collectors of the transistors 81 and 82 are joined and connected to an input of ladder network 72. The emitters of the transistors are connected across the ±5 volt supply, and the ends of the resistor chain are connected across the ±15 volt supply. The positive and negative voltage supplies are used to provide the required bipolar output to ladder network 72. When the input from the flip-flop 70 to the junction of capacitors 79 and 80 is zero, PNP transistor 81 conducts and applies +5 volts to ladder network 72, and when the flip-flop input is +5 volts, NPN transistor 82 conducts and applies −5 volts to ladder network 72. Ladder network 72 performs binary summing in a well known fashion and provides a bipolar output which is amplified by a factor of approximately twenty in bipolar amplifier 83 and applied to the helix of BWO 45.

In order to provide both positive and negative voltages, increasing and decreasing respectively from zero, the helix data is coded differently depending upon which half of the BWO frequency range is to be used. To set a BWO frequency in the lower half of the range, the number defined by the first seven data bits is binary coded in two's complement form, and the sign bit is a logical one. With the sign bit a logical one, the output at the Q terminal of flip-flop 70 at the far right in FIG. 4 is a logical zero, or zero volts. It should be noted again that the right hand flip-flop as shown in FIG. 4, containing the sign bit, is the only one of flip-flops 70 that has an inverted output, that is, taken from the $\overline{Q}$ rather than the Q terminals. With the sign bit a logical one and all other bits equal to zero, the D/A converter circuit provides a zero voltage output to the helix, and BWO 45 oscillates at its band center frequency. The two's complement coding provides a more negative helix voltage, and a corresponding decreasing BWO frequency, the higher the count.

To set a BWO frequency in the upper half of the frequency band, the sign bit is a logical zero, which becomes a logical one (+5 volts) at the output of the sign flip-flop on the far right, and the number represented by the other 7 data bits is conventionally coded. This results in a more positive helix voltage, and an increasing BWO frequency, the higher the count.

The components of the circuit are standard and are not critical. Flip-flops 70 may each be one-half of a Texas Instruments Model SN7474N dual flip-flop. The PNP transistors 81 may be type MPS6534 available from Motorola, and the NPNs 82 may be type MPS6531 available from the same manufacturer. The resistance ladder network 72 may be a Helipot Model 815 R 10K. Resistors 75, 76, 77 and 78 may have values of 8.2 Kohms, 1.8 Kohms, 1.8 Kohms and 3.0 Kohms, respectively. Capacitors 79 and 80 may have values of 560 and 470 picafarads, respectively.

AMPLITUDE REGISTER AND D/A CONVERTER

The amplitude register and D/A converter indicated as 50 and 51 in FIG. 3 and shown in more detail in FIG. 5, are conventional in construction and operation. Pulse amplitude information is provided in eleven binary bits.

The register 50 comprises eleven identical flip-flops 85 each of which is connected to a corresponding transistorized switch circuit 86. The output of each switch circuit is connected to a resistance ladder network 87 which provides the conventional binary summing and feeds current amplifier 52, which provides the current drive for PIN diode 53 (shown on FIG. 3). Only two of the eleven identical stages are shown on FIG. 5, for convenience.

The eleven bits of pulse amplitude data are presented to the D terminals of flip-flops 85 and are entered into the register when the flip-flops each receive a +5 volt signal at terminal C upon enabling of gate 88 by a LOAD signal from the output of gate 56, shown on FIG. 3. The flip-flops in the register are cleared by a +5 volt signal at their S terminals applied when gate 89 is enabled by a CLEAR signal from the output of multivibrator 61, shown on FIG. 3.

The switch circuits are similar to those used in the helix D/A converter 47 shown on FIG. 4, except that the amplitude D/A converter switches are not bipolar and therefore use only positive voltage supplies and require a slightly different transistor arrangement. Each switch has four series resistors 89, 90, 91 and 92 with capacitors 93 and 94 across resistors 90 and 91, respectively. PNP and NPN transistors 95 and 96 have their bases connected to the junction of resistors 89 and 90, and 91 and 92, respectively, and the collector of transistor 95 is joined to the emitter of transistor 96 and connected to a terminal of ladder network 87.

The binary signals loaded into flip-flops 85 appear on the $\overline{Q}$ output terminal of each flip-flop and are input to the corresponding switch 86 at the junction of capacitors 93 and 94. When the output at $\overline{Q}$ is zero (corresponding to a logic one input on terminal D), PNP transistor 95 conducts, putting +5 volts on the corresponding terminal of ladder network 87. When the $\overline{Q}$ output is +5 volts, NPN transistor 96 conducts and places the corresponding terminal of ladder network 87 at ground potential.

Flip-flops 85 may each be one-half of a Texas Instruments Model SN7474N dual flip-flop. The PNP transistors 95 may be Motorola type MPS 6534 and the NPNs 96 may be MOtorola type MPS 6531. Resistance ladder network 87 may be Helipot MOdel 811-R10K-A11. Resistors 89, 90, 91 and 92 may have values of 1.8 Kohm, 560 ohms, 620 ohms, and 8.2 Kohms, respectively. Capacitors 93 and 94 may have values of 470 and 560 picafarads, respectively.

The output of current amplifier 52 is fed to PIN diode 53, which is shown on FIG. 3 schematically as a variable resistance. PIN diodes are conventional devices in which an intermediate layer is interposed between the P and N doped regions of the diode, and at high frequencies, such as that used in this embodiment, the PINdiode acts as a variable impedance, with the impedance value being controlled by the current supplied to the intermediate layer. By varying the impedance of this diode in the output line of the BWO, the amplitude of the resulting pulse is adjusted. PIN diode HP8732B, available from Hewlett-Packard and having a dynamic range of 80 dB over the S band frequency range, may be used in this application.

Other specific embodiments of the invention may be created without departing from the scope of the invention, which is defined solely by the appended claims.

What is claimed is:

1. A test system for simulating the effect of a plurality of simultaneously emitting environmental pulsed emitters on an electronic equipment under test comprising:
   a. a storage medium
   b. computer means for providing on said storage medium data defining the time-varying parameters of each signal that would result at the equipment under test from the emission from each separate environmental emitter, said data including data defining the pulse recurrence frequency of each of the simultaneous emissions;

c. a plurality of pulse recurrence frequency generators, corresponding on a one-to-one basis to each of the simultaneous pulsed emissions, for acquiring from said storage medium data defining the pulse recurrence frequency for its corresponding emission, storing said data and generating a series of signals indicative of the time positions of pulses emitted at the pulse recurrence frequency of its corresponding emitter;

d. pulse generation means for receiving each said signal from said plurality of pulse recurrence frequency generators, acquiring there upon data defining other parameters of the emission to which said signal corresponds and generating a pulse in accordance therewith.

2. The test system of claim 1 in which said pulse generation means includes a least one radio frequency oscillator having means to adjust its frequency in accordance with the parameters defined by said data prior to generation of each pulse.

3. The test system of claim 2 in which said radio frequency oscillator is a backward wave oscillator and in which said frequency adjusting means comprises means to adjust the voltage upon the helix of said oscillator.

4. The test system of claim 2 in which said pulse generation means includes a plurality of radio frequency oscillators, each being adjustable in frequency over a certain range of frequencies, and including further means to permit each of said oscillators to receive said pulses from only those of said pulse recurrence frequency generators corresponding to emissions that are in that certain range of frequencies over which the oscillator is adjustable.

5. The test system of claim 4 in which said radio frequency oscillators are backward wave oscillators and in which said frequency adjusting means comprises means to adjust the voltage upon the helix of each of said oscillators.

6. The test system of claim 4 including further memory means, means to transfer all of said data defining the time-varying parameters of the emissions, except for data defining the pulse recurrence frequencies, from said storage medium to said memory, and means for retrieving data from said memory upon the command of each said signal from said pulse recurrence frequency generators and transferring said retrieved data to said pulse generation means for generation of a pulse by one of said oscillators.

* * * * *